Patented Nov. 18, 1924.

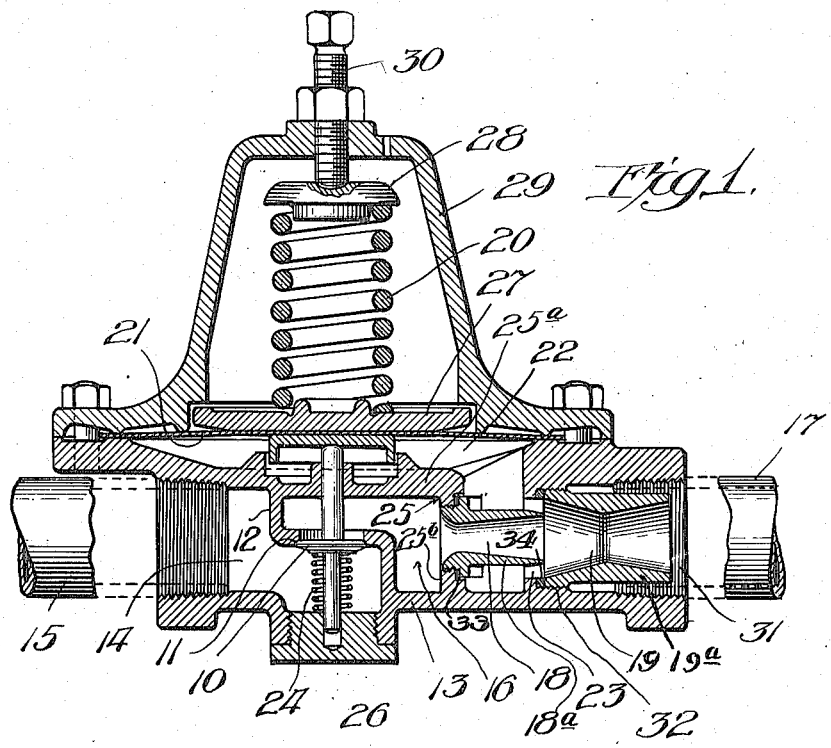
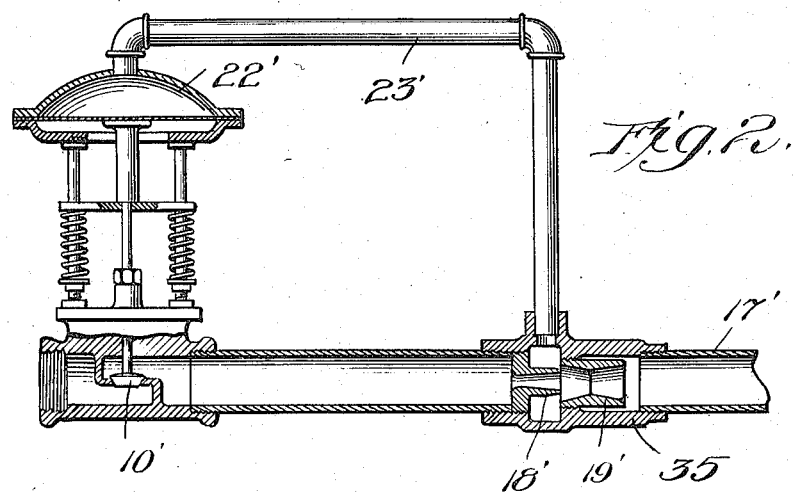

1,515,911

UNITED STATES PATENT OFFICE.

CHARLES M. TERRY, OF DECATUR, ILLINOIS, ASSIGNOR TO A. W. CASH COMPANY, OF DECATUR, ILLINOIS, A CORPORATION OF DELAWARE.

PRESSURE REDUCING AND REGULATING VALVE.

Application filed June 30, 1922. Serial No. 571,897.

*To all whom it may concern:*

Be it known that I, CHARLES M. TERRY, a citizen of the United States, residing at Decatur, in the county of Macon and State of Illinois, have invented certain new and useful Improvements in Pressure Reducing and Regulating Valves, of which the following is a specification.

Pressure reducing and regulating valves, as usually employed in steam-pipe lines and other conduits for fluid-flow, usually comprise a valve proper that is pressure loaded in a direction tending to open it, but with this loading opposed by a fluid-imposed counter-pressure tending to cause or permit the valve to close, such counter-pressure being derived from some control area in the fluid-flow system on the delivery side of the valve,—usually the outlet chamber of the valve casing itself. Generically with a valve arrangement as thus described, maximum pressure in the delivery pipe is that which exists when said pipe is wholly closed, or in other words, no fluid-demand exists. Under such zero-demand condition, such a pressure exists throughout the entire system on the delivery side of the valve that, working as counter-pressure against the loading of the valve, it is just adequate to hold the valve closed. As fluid demand begins, there is a drop in pressure at the control-area of the system that permits the pressure-loading of the valve to open the latter slightly, and any further opening of the valve is dependent upon further pressure reduction at the control area. Consequently, it is generally true of valves as thus far described, that delivery pressure in the delivery pipe follows a descending curve from maximum pressure at zero-demand to minimum pressure at greatest demand or full opening of the valve.

For many purposes it is highly desirable that increased demand upon a fluid delivery pipe shall not be accompanied by a drop in pressure in the pipe, but rather that the delivery-pipe pressure shall be maintained at, or augumented above, the normal maximum pressure as the valve progressively opens; and a salient object of my invention is to provide a valving organization so to function. Other objects of my invention are to provide for structural simplicity, compactness, manufacturing economy, ease of adaptation to meet widely variant demands as to performance, and certainty of operation under predetermined conditions.

In building according to my present invention, I make such provision that the counter-pressure tending to cause or permit closing of the valve varies disproportionally to the pressure in the delivery pipe, so that said delivery-pipe pressure will be greater than said counter-pressure during a predetermined portion of the range of progressive opening of the valve. To this end I so construct the valve that the counter-pressure tending to seat the valve is exerted in a space wherein pressure-reduction may be induced by velocity of fluid flow from the delivery side of the valve into the delivery pipe, thus lowering the counter-pressure below the delivery pressure.

In the drawings, Fig. 1 is a central vertical section through a valve embodying my invention and Fig. 2 illustrates a modified structure also embodying my invention in its broader aspect.

In the preferred construction shown in Fig. 1, the valve shell or body casting 13 houses a valve 10 coacting with a seat 11 in a seat-wall or septum 12 to control communication between the initial pressure space or inlet chamber 14 (into which the fluid supply pipe 15 opens) and a pressure-reduction space or delivery chamber 16. Fluid passing through the valved port may flow from the chamber 16 to delivery pipe 17 past a suitable suction point which is open to a control-space wherein the pressure acts to resist valve opening. In the form shown the fluid passes through a restricted orifice or jet-passage 18 that opens toward and is in suitable proximity to a suction orifice or delivery passage 19 that is open to the control-space, before reaching the delivery pipe 17. For valve-loading, tending to open it, suitable provision is made as by a spring 20 acting against one end of the valve stem, and for exertion of fluid-counter-pressure a diaphragm 21 may be employed forming a wall of a control space or counter-pressure chamber 22 wherein pressure is to be suction-varied, and which opens at 23 to the suction end of passage 19 around the jet nozzle 18ª. A relatively light spring 24 may be interposed between valve 10 and the inlet chamber wall, to seat the valve when the diaphragm rises.

In the specific construction shown the valve shell 13 is divided into the three chambers 14, 16 and 22 by the two partitions 12 and 25, the latter having a horizontal top wall 25ª and a vertical side wall 25ᵇ facing toward the delivery pipe 17. A screw plug 26 at the bottom of the shell is removable to permit withdrawal of valve 10, and diaphragm 21 is clamped upon the body casting by a suitable cap 29 which houses the spring and its customary bearing plates 27 and 28. For easy removability through the threaded orifice 31 for the delivery pipe 17, jet tube 18ª is threaded into an orifice in wall 25ᵇ and delivery tube 19ª is threaded into a shoulder 32 of the valve casing, each such tube being preferably axially adjustable by variation of thickness of the shim-washers 33 and 34. Of course the shapes, sizes and relative positions of the tubes will depend upon the fluid used and the particular conditions to be met, to give desired differentiation between fluid-pressure in the delivery pipe 17 and the counter-pressure in chamber 22 upon the existence of a given fluid demand; but for use with steam it is desirable that the jet tube have a suitable expansion flare and that the delivery tube shall have a suction-end tapering to a minimum diameter slightly greater than the end bore of the jet tube and shall have an expansion flare at each delivery end.

With the delivery pipe 17 closed, or in other words, on zero-demand, fluid under pressure entering the casing and passing through the spring-opened valve, the chambers 16 and 22 will cause the valve to close with pressure determined by the spring-loading. This I will refer to as the normal maximum delivery-pressure. As demand on pipe 17 begins, pressure drop in chamber 22 permits the valve to open and at very low demand the delivery pressure in pipe 17 will be somewhat below the normal maximum. As the demand increases to a suitable extent the delivery pressure is maintained or augmented, since the fluid in flow through the relatively restricted jet passage 18 increases its velocity and, crossing the suction space of tube 19, creates a suction or pressure reduction in the control chamber 22. This weakening of the counter-pressure below the diaphragm permits further opening of the valve and augmentation of fluid supply to, and of pressure in, the delivery chamber 16 and (through the tube) tends to maintain or enhance the pressure in the delivery pipe 17. Thus, instead of encountering a progressive drop in delivery pressure in pipe 17 under progressively increasing demand (as would be the case were the jet and delivery tube both removed from the construction shown) I am able to produce a delivery-pressure curve in which, after a pressure drop during a period of minimal demand, the pressure rises to, and may be made to go considerably above, if desired, the normal maximum pressure as maximum-demand conditions are approached. Of course, whatever be the definite demand on the delivery pipe the valve will seek and maintain a definite position giving a certain degree of opening, because were the valve-opening to become excessive, over-development of pressure in the delivery pipe would reduce the pressure difference between the delivery chamber and the delivery pipe, thus decreasing the velocity of fluid-flow across the suction space, weakening the suction or, otherwise stated, augmenting the pressure in the control space until spring-load and counter pressure affecting the diaphragm would properly balance.

In Fig. 2 I have shown in generally diagrammatic fashion, a construction for applying my invention to divers forms of standard valves by supplementing them with an externally applied attachment, the jet tube 18′ and delivery tube 19′ being fitted into a hollow shell 35 with which the counter-pressure chamber 22′ communicates by a pipe 23′. The action will, in principle, remain unchanged, and obviously such construction enables the control area to be located in the delivery pipe at any suitable point beyond the valve.

I have found in practice that with a given tube-equipment, material variation in the delivery-pressure curve may be brought about by change in the axial spacing of the two tubes, and this is probably due to the fact that the suction influencing the control-chamber's counter-pressure is in part dependent upon the extent to which the jet crossing the suction space fills the orifice of passage 19. Thus, by variation of dimensions affecting the suction conditions I have produced delivery-pressure curves varying from one showing substantially uniform maintenance of delivery-pressure after an initial pressure drop, to curves rising to show the delivery pressure at full demand considerably above the normal maximum pressure.

It will be understood that while for purposes of disclosure I have illustrated a construction designed more especially for use in connection with steam, my invention may be applied to liquid flow-pipes, and further that while in Fig. 1 I have shown a preferred simple construction some of the specific features of which I may claim for their particular advantage, my invention is not limited thereto in its broader aspects and many changes in the specific construction and arrangement of parts may be made within the scope of the appended claims.

I claim:

1. In a pressure-reducing and regulating valve, structure providing an intial-pressure space, a delivery space having a port to said initial pressure space and having a delivery opening, and a counter-pressure space; a valve for said port loaded to open in opposition to the pressure of said counter-pressure space, a delivery pipe aligning with the said delivery opening, a Venturi tube in the receptive end of said delivery pipe, and a nozzle in said delivery opening, smaller than and aligning with the receptive end of said Venturi tube and leaving an opening around said nozzle between said Venturi tube and said counter-pressure space.

2. In a pressure-reducing and regulating valve, a body structure providing an inlet opening, an outlet opening and between said openings a diaphragm-receptive opening, and having walls dividing said body internally into an initial pressure space, a delivery space, having a port to said initial pressure space and a delivery opening toward the outlet, and a counter-pressure space open to the diaphragm-receptive opening, a diaphragm closing said latter opening, a spring acting on said diaphragm, a valve for the port between the inital-pressure and delivery spaces openable by the spring pressure transmitted through said diaphragm, a Venturi tube carried by said body within the outlet, and a nozzle for the delivery opening from said delivery chamber aligning with and smaller than the receptive end of said Venturi tube and leaving, around its end portion, a space for communication between said counter-pressure space and said Venturi tube.

CHARLES M. TERRY.